United States Patent Office 3,206,450
Patented Sept. 14, 1965

3,206,450
PHENYLHYDRAZIDES OF DIPEPTIDES CONTAINING ALPHA AMINO DIBASIC ACIDS
Ronald Burger Kelly, Cooper Township, Kalamazoo County, Mich., assignor to The Upjohn Company, Kalamazoo, Mich., a corporation of Delaware
No Drawing. Filed Aug. 2, 1962, Ser. No. 214,188
12 Claims. (Cl. 260—112.5)

The present invention is directed to novel phenylhydrazides of dipeptides containing α-amino dibasic acids and to a novel process wherein the phenylhydrazide group is selectively cleaved in the presence of other protective groups.

The novel dipeptides of the present invention can be represented by the formula:

$$R_3\text{-}C_6H_4\text{-}NH\text{-}NH\text{-}\underset{\|}{C}(=O)\text{-}(C_nH_{2n})\text{-}\underset{\underset{R_2}{|}}{\underset{|}{C}}H(NH)\text{-}\underset{\|}{C}(=O)\text{-}NH\text{-}Y \quad (I)$$

wherein $n$ is an integer from zero to 7, inclusive; $R_3$ represents hydrogen, methylol, carboxy, alkyl of 1 to 4 carbon atoms, inclusive, e.g., methyl, ethyl, propyl, isopropyl, butyl, isobutyl, and the like, halogen, e.g., bromo, chloro, fluoro and iodo, and alkoxy of 1 to 4 carbon atoms, inclusive, e.g., methoxy, ethoxy, propoxy, isopropoxy, butoxy, isobutoxy, and the like; $R_1$ represents hydrogen and alkyl of 1 to 4 carbon atoms, inclusive, e.g., methyl, ethyl, propyl, butyl, isobutyl, isopropyl, and the like; $R_2$ represents hydrogen, carbobenzyloxy $$\left(O=\underset{|}{C}\text{-}O\text{-}CH_2\text{-}C_6H_5\right)$$

carboallyloxy $$(O=\underset{|}{C}\text{-}O\text{-}CH_2\text{-}CH=CH_2)$$

and tosyl $$(-SO_2\text{-}C_6H_4\text{-}CH_3)$$

and $$-\underset{\underset{Y}{|}}{N}H$$

is the residue of an α-amino monobasic acid or ester thereof, said residue being derived from the α-amino acid or ester by removing a hydrogen atom from the amino group. Examples of α-amino monobasic acids are glycine, valine, leucine, phenylalanine, methionine, alanine, tyrosine, proline, serine, isoleucine, tryptophan, cysteine, threonine, norleucine, hydroxyproline, and the like. Examples of esters of such acids are alkyl esters of 1 to 6 carbon atoms, inclusive, e.g., methyl, ethyl, propyl, isopropyl, butyl, isobutyl, amyl hexyl, and the like, benzyl, phenyl, p-nitrobenzyl and p-nitrophenyl.

As is evident from Formula I, the compounds of the present invention can exist in different stereoisomeric configurations due to the presence of at least one asymmetric carbon atom. It is, therefore, to be understood that the various stereoisomeric forms, such as the L-, D-, L,L-, D,D-, and D,L-forms, are within the scope of the present invention.

The dipeptides of the present invention (Formula I above) are prepared by condensation of an α-amino dibasic acid hydrazide represented by the formula:

$$R_3\text{-}C_6H_4\text{-}NH\text{-}NH\text{-}\underset{\|}{C}(=O)\text{-}(C_nH_{2n})\text{-}\underset{\underset{R_6}{|}}{\underset{|}{C}}H(NH)\text{-}COOH \quad (II)$$

wherein $n$, $R_1$, and $R_3$ have the above values and $R_6$ is carbobenzyloxy, tosyl, and carboallyloxy, with an α-amino monobasic acid ester, e.g., the esters of glycine, valine, leucine, phenylalanine, methionine, alanine, tyrosine, proline, serine, isoleucine, tryptophan, cysteine, threonine, norleucine and hydroxyproline, as noted above, utilizing Woodward's Reagent K, N-ethyl-5-phenylisoxazolium-3'-sulfonate (Woodward et al., J. Amer. Chem. Soc. 83, 1010, 1961), as a condensing agent to produce a novel dipeptide of the following formula:

$$R_3\text{-}C_6H_4\text{-}NH\text{-}NH\text{-}\underset{\|}{C}(=O)\text{-}(C_nH_{2n})\text{-}\underset{\underset{R_6}{|}}{\underset{|}{C}}H(NH)\text{-}\underset{\|}{C}(=O)\text{-}NH\text{-}Y_1 \quad (III)$$

wherein $n$, $R_1$, $R_3$, and $R_6$ have the above values, and $$-\underset{\underset{Y_1}{|}}{N}H$$

is the ester residue of the α-amino monobasic acid, saponifying the dipeptide of Formula III to produce a novel unesterified dipeptide of the following formula:

$$R_3\text{-}C_6H_4\text{-}NH\text{-}NH\text{-}\underset{\|}{C}(=O)\text{-}(C_nH_{2n})\text{-}\underset{\underset{R_6}{|}}{\underset{|}{C}}H(NH)\text{-}\underset{\|}{C}(=O)\text{-}NH\text{-}Y_2 \quad (IV)$$

wherein $n$, $R_1$, $R_3$, and $R_6$ have the above values, and $$-\underset{\underset{Y_2}{|}}{N}H$$

is the unesterified α-amino acid residue, and cleaving the $R_6$ protective group to produce a novel dipeptide of the following formula:

$$R_3\text{-}C_6H_4\text{-}NH\text{-}NH\text{-}\underset{\|}{C}(=O)\text{-}(C_nH_{2n})\text{-}\underset{\underset{NH_2}{|}}{\underset{|}{C}}H\text{-}\underset{\|}{C}(=O)\text{-}NH\text{-}Y_2 \quad (V)$$

wherein $n$, $R_1$, $R_3$, and $$-\underset{\underset{Y_2}{|}}{N}H$$

have the above values.

The condensation of the compounds of Formula II and α-amino monobasic acid esters to prepare the compounds of Formula III can be carried out under the conditions set forth by Woodward et al., supra.

The saponification of the compounds of Formula III to produce the compounds of Formula IV is carried out by utilizing at least two equivalents of an alkali, e.g., sodium or potassium hydroxide, for complete saponification of the ester of Formula III.

The cleavage of the carbobenzyloxy protective group from the compounds of Formula IV to produce the compounds of Formula V is preferably carried out by catalytic hydrogenolysis utilizing a palladium catalyst, such as, palladium-barium sulfate, palladium-charcoal, palladium-black, and the like, with a 10% palladium-charcoal catalyst being preferred. Other concentrations between about 1% and 50% can also be employed, with a somewhat shorter reaction time being required at the higher concentrations. Inert solvents in which the hydrogenolysis can be carried out include, among others, lower alkanols, such as aqueous or anhydrous methanol, ethanol and isopropanol. After the hydrogenolysis has been completed, the dipeptides of Formula V can be isolated and purified by conventional techniques, such as filtration to remove the catalyst, chromatography, removal of the solvent, recrystallization, and the like. Sodium and liquid ammonia, phosphonium iodide, and hydrogen halides in glacial acetic acid can also be employed to cleave the carbobenzyloxy group as disclosed in U.S. Patent 2,723,973.

The cleavage of the carboallyloxy protective group from the compounds of Formula IV is preferably carried out by catalytic hydrogenolysis using platinum oxide catalyst in acidified ethanol as disclosed by Milne et al., J. Amer. Chem. Soc. 79, 637–39, 1957. This process can also be employed to cleave the carbobenzyloxy protective group.

The cleavage of the tosyl protective group from the compounds of Formula IV is preferably carried out by means of sodium and liquid ammonia as disclosed by Milne et al., J. Amer. Chem. Soc. 79, 639–44, 1957. Alternatively, it can be cleaved by other procedures disclosed by the same authors, e.g., by means of Raney nickel, or hydriodic acid in glacial acetic acid, or hydrobromic acid and phenol.

The α-amino dibasic acid hydrazides (Formula II) can be prepared by reacting an azide having the formula:

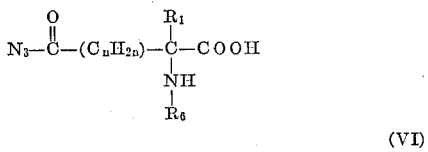

(VI)

wherein $R_1$, $R_6$ and $n$ have the values represented above, with a phenylhydrazine having the formula:

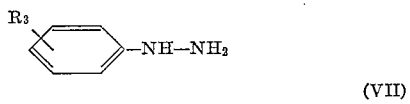

(VII)

wherein $R_3$ has the values represented above, to produce the α-amino dibasic acid hydrazide (Formula II). The reaction is advantageously carried out in the presence of an inert solvent, e.g., ether, ethyl acetate, chloroform, methylene chloride, and the like. The reaction is advantageously carried out at a temperature between about −15° C. and about 10° C., preferably between about −5° C. and about 0° C. Upon completion of the reaction, the resulting hydrazide (Formula II) can be isolated and purified if so desired, using conventional techniques, such as filtration, solvent extraction, evaporation, recrystallization, and the like.

The azides (Formula VI) can be prepared according to conventional procedure as disclosed in U.S. Patent 2,723,973. For example, L-N-carbobenzyloxyglutamic acid 5-azide is prepared by reacting 5-ethyl L-glutamate hydrochloride with benzyl chloroformate to produce 5-ethyl L-N-carbobenzyloxyglutamate, reacting the latter compound with hydrazine hydrate to produce L-N-carbenzyloxyglutamic acid 5-hydrazide, which when reacted with nitrous acid (generated in situ with sodium nitrite and hydrochloric acid) results in the preparation of L-N-carbobenzyloxyglutamic acid 5-azide.

By substituting other ω-alkyl esters of α-amino dibasic acids (i.e., monoalkyl esters in which the carboxyl group farthest removed from the amino group is esterified) in the process of U.S. Patent 2,723,973, such as the ω-methyl and ω-ethyl esters of aminomalonic acid, aspartic acid, 2-methylaspartic acid, 3,3-dimethylaspartic acid, 2-propylaspartic acid, 3-butylaspartic acid, 3-methylaspartic acid, 2-methylglutamic acid, 3-methylglutamic acid, 4-methylglutamic acid, 2-aminohexanedioic acid, 2-aminoheptanedioic acid, 2-aminooctanedioic acid, 2-aminononanedioic acid, and 2-aminodecanedioic acid for 5-ethyl L-glutamate, the following hydrazides and azides, respectively, are prepared: N-carbobenzyloxyaminomalonic acid hydrazide, N-carbobenzyloxyaminomalonic acid azide; N-carbobenzyloxyaspartic acid 4-hydrazide, N-carbobenzyloxyaspartic acid 4-azide; N-carbobenzyloxy-2-methylaspartic acid 4-hydrazide, N-carbobenzyloxy-2-methylaspartic acid 4-azide; N-carbobenzyloxy-3,3-dimethylaspartic acid 4-hydrazide, N-carbobenzyloxy-3,3-dimethylaspartic acid 4-azide; N-carbobenzyloxy-2-propylaspartic acid 4-hydrazide, N-carbobenzyloxy-2-propylaspartic acid 4-azide; N-carbobenzyloxy-3-butylaspartic acid 4-hydrazide, N-carbobenzyloxy-3-butylaspartic acid 4-azide; N-carbobenzyloxy-3-methylaspartic acid 4-hydrazide, N-carbobenzyloxy-3-methylaspartic acid 4-azide; N-carbobenzyloxy-2-methylglutamic acid 5-hydrazide, N-carbobenzyloxy-2-methylglutamic acid 5-azide; N-carbobenzyloxy-3-methylglutamic acid 5-hydrazide, N-carbobenzyloxy-3-methylglutamic acid 5-azide; N-carbobenzyloxy-4-methylglutamic acid 5-hydrazide, N-carbobenzyloxy-4-methylglutamic acid 5-azide; N-carbobenzyloxy-2-aminohexanedioic acid 6-hydrazide, N-carbobenzyloxy-2-aminohexanedioic acid 6-azide; N-carbobenzyloxy-2-aminoheptanedioic acid 7-hydrazide, N-carbobenzyloxy-2-aminoheptanedioic acid 7-azide; N-carbobenzyloxy-2-aminooctanedioic acid 8-hydrazide, N-carbobenzyloxy-2-aminooctanedioic acid 8-azide; N-carbobenzyloxy-2-aminononanedioic acid 9-hydrazide, N-carbobenzyloxy-2-amononononanedioic acid 9-azide; N-carbobenzyloxy-2-aminodecanedioic acid 10-hydrazide, N-carbobenzyloxy-2-aminodecanedioic acid 10-azide.

By employing the foregoing ω-alkyl esters of α-amino dibasic acids in the process of U.S. Patent 2,723,973, but substituting allyl chloroformate and p-toluenesulfonyl chloride (tosyl chloride) for benzyl chloroformate, the following hydrazides and azides are prepared:

N-carboallyloxyglutamic acid 5-hydrazide,
N-tosylglutamic acid 5-hydrazide,
N-carboallyloxyglutamic acid 5-azide,
N-tosylglutamic acid 5-azide;
N-carboallyloxyaminomalonic acid hydrazide,
N-tosylaminomalonic acid hydrazide,
N-carboallyloxyaminomalonic acid azide,
N-tosylaminomalonic acid azide;
N-carboallyloxyaspartic acid 4-hydrazide,
N-tosylaspartic acid 4-hydrazide,
N-carboallyloxyaspartic acid 4-azide,
N-tosylaspartic acid 4-azide;
N-carboallyloxy-2-methylaspartic acid 4-hydrazide,
N-tosyl-2-methylaspartic acid 4-hydrazide,
N-carboallyloxy-2-methylaspartic acid 4-azide,
N-tosyl-2-methylaspartic acid 4-azide;
N-carboallyloxy-3,3-dimethylaspartic acid 4-hydrazide,
N-tosyl-3,3-dimethylaspartic acid 4-hydrazide,
N-carboallyloxy-3,3-dimethylaspartic acid 4-azide,
N-tosyl-3,3-dimethylaspartic acid 4-azide;
N-carboallyloxy-2-propylaspartic acid 4-hydrazide,
N-tosyl-2-propylaspartic acid 4-hydrazide,
N-carboallyloxy-2-propylaspartic acid 4-azide,
N-tosyl-2-propylaspartic acid 4-azide;
N-carboallyloxy-3-butylaspartic acid 4-hydrazide,
N-tosyl-3-butylaspartic acid 4-hydrazide,
N-carboallyloxy-3-butylaspartic acid 4-azide,
N-tosyl-3-butylaspartic acid 4-azide;
N-carboallyloxy-3-methylaspartic acid 4-hydrazide,
N-tosyl-3-methylaspartic acid 4-hydrazide,
N-carboallyloxy-3-methylaspartic acid 4-azide,
N-tosyl-3-methylaspartic acid 4-azide;
N-carboallyloxy-3-methylglutamic acid 5-hydrazide,
N-tosyl-2-methylglutamic acid 5-hydrazide,
N-carboallyloxy-2-methylglutamic acid 5-azide,
N-tosyl-2-methylglutamic acid 5-azide;
N-carboallyloxy-3-methylglutamic acid 5-hydrazide,
N-tosyl-3-methylglutamic acid 5-hydrazide,
N-carboallyloxy-3-methylglutamic acid 5-azide,
N-tosyl-3-methylglutamic acid 5-azide;
N-carboallyloxy-4-methylglutamic acid 5-hydrazide,
N-tosyl-4-methylglutamic acid 5-hydrazide,
N-carboallyloxy-4-methylglutamic acid 5-azide,
N-tosyl-4-methylglutamic acid 5-azide;
N-carboallyloxy-2-aminohexanedioic acid 6-hydrazide,
N-tosyl-2-aminohexanedioic acid 6-hydrazide,
N-carboallyloxy-2-aminohexanedioic acid 6-azide.

N-tosyl-2-aminohexanedioic acid 6-azide;
N-carboallyloxy-2-aminoheptanedioic acid 7-hydrazide,
N-tosyl-2-aminoheptanedioic acid 7-hydrazide,
N-carboallyloxy-2-aminoheptanedioic acid 7-azide,
N-tosyl-2-aminoheptanedioic acid 7-azide;
N-carboallyloxy-2-aminooctanedioic acid 8-hydrazide,
N-tosyl-2-aminooctanedioic acid 8-hydrazide,
N-carboallyloxy-2-aminooctanedioic acid 8-azide,
N-tosyl-2-aminooctanedioic acid 8-azide;
N-carboallyloxy-2-aminononanedioic acid 9-hydrazide,
N-tosyl-2-aminononanedioic acid 9-hydrazide,
N-carboallyloxy-2-aminononanedioic acid 9-azide,
N-tosyl-2-aminononanedioic acid 9-azide;
N-carboallyloxy-2-aminodecanedioic acid 10-hydrazide,
N-tosyl-2-aminodecanedioic acid 10-hydrazide,
N-carboallyloxy-2-aminodecanedioic acid 10-azide, and
N-tosyl-2-aminodecanedioic acid 10-azide.

Generally speaking, the azides (Formula VI) are not particularly stable. Therefore, it is preferred not to isolate them, but to prepare solutions of them (e.g., ether or chloroform solutions) which are then used in further synthesis as soon thereafter as is practicable.

The following examples are illustrative of the present invention.

EXAMPLE 1

*5-(2-phenylhydrazide) of α-L-glutamylglycine*

A. L-N-CARBOBENZYLOXYGLUTAMIC ACID 5-HYDRAZIDE

To a stirred solution of 53.4 g. of 5-methyl L-glutamate, 59 g. of sodium bicarbonate, and 720 ml. of water, cooled to 0–5° C. in an ice bath, was added 60 ml. of benzylchloroformate over a period of 25 minutes. Stirring and cooling was continued for 1.5 hours, the cooling bath was removed, and the mixture was stirred for an additional 2 hours. The mixture was extracted with three 700-ml. portions of ether, acidified with concentrated hydrochloric acid, and extracted with three 1000-ml. portions of ethyl acetate. The extracts were washed with 250 ml. of water containing 1.5 g. of sodium bicarbonate, combined, and evaporated to a syrup under reduced pressure. The syrup was crystallized twice from carbon tetrachloride to produce 40 g. of 5-methyl L-N-carbobenzyloxyglutamate melting at 70° C.

17.0 g. of 5-methyl L-N-carbobenzyloxyglutamate was dissolved in 40 ml. of absolute ethanol and the solution was treated, with cooling, with 18 ml. of hydrazine hydrate (99–100%). The reaction mixture was left in a stoppered flask at 25° C. for 48 hours. It was then concentrated under reduced pressure at 38° C. to 15 ml. Water (130 ml.) was added to the residue and the aqueous solution was cooled in an ice bath while being treated with concentrated hydrochloric acid. When the solution became acidic, the product crystallized and was then collected on a funnel and washed with water, methanol and ether. The dried product, L-N-carbobenzyloxyglutamic acid 5-hydrazide, weighed 13.0 g. and melted at 179–180° C.

*Analysis.*—Calcd. for $C_{13}H_{17}N_3O_5$: C, 52.97; H, 5.80; N, 14.23. Found: C, 52.71; H, 5.62; N, 14.72.

B. L-N-CARBOBENZYLOXYGLUTAMIC ACID 5-AZIDE

A solution of 54.4 g. (0.18 mole) of L-N-carbobenzyloxyglutamic acid 5-hydrazide in 300 ml. of 3 N hydrochloric acid and 100 ml. of water was cooled in an ice bath. The cooled solution was covered with cold (−10° C.) ether and the mixture was stirred while a cold solution of 15.2 g. (0.22 mole) of sodium nitrite in 100 ml. of water was added over a period of 15 min. The lower layer was separated and extracted with two 1000-ml. portions of cold (−10° C.) ether. The ether extracts were washed with two 500-ml. portions of ice water, combined, and dried briefly over anhydrous sodium sulfate. There was thus obtained a cold (0° C.) ether solution of L-N-carbobenzyloxyglutamic acid 5-azide.

C. L-N-CARBOBENZYLOXYGLUTAMIC ACID 5-(2-PHENYLHYDRAZIDE)

The above ether solution of L-N-carbobenzyloxyglutamic acid 5-azide was added portionwise with stirring over a period of 20 minutes to a solution of 43.2 g. (0.40 mole) of phenylhydrazine in 500 ml. of ether cooled in an ice bath. The reaction mixture was cooled in the ice bath for 8 hours and then kept at 25° C. for 8 hours. The resulting precipitate (76.2 g.) was collected and washed with ether and was then dissolved in a mixture of 1000 ml. of ethyl acetate and 500 ml. of 1 N sulfuric acid. The layers were separated and the aqueous layer was extracted with two 1000-ml. portions of ethyl acetate. The ethyl acetate extracts were washed with two 500-ml. portions of 1 N sulfuric acid, then with two 250-ml. portions of water. The original ethyl acetate layer and the ethyl acetate extracts were dried over anhydrous sodium sulfate, combined, and evaporated under reduced pressure at 38° C. to a thick syrup which was crystallized from 60% methanol. The yield of crystalline material, L-N-carbobenzyloxyglutamic acid 5-(2-phenylhydrazide), was 47.3 g. (70%). The product, after being recrystallized from ethanol-water (65%), melted at 70–80° C., slowly resolidified between 100–140° C., and finally melted at 148–149° C.

*Analysis.*—Calcd. for $C_{19}H_{21}N_3O_5$: C, 61.44; H, 5.70; N, 11.32. Found: C, 61.12; H, 5.86; N, 11.25.

D. 5-(2-PHENYLHYDRAZIDE) OF N-CARBOBENZYLOXY-α-L-GLUTAMYLGLYCINE ETHYL ESTER

Woodward's Reagent K (2.026 g., 0.008 mole) in 50 ml. of acetonitrile was treated with a solution of 2.968 g. (0.008 mole) of L-N-carbobenzyloxyglutamic acid 5-(2-phenylhydrazide) in 25 ml. of acetonitrile containing 1.11 ml. (0.008 mole) of triethylamine. The mixture was stirred at 25° C. for 30 minutes until all the material was in solution. This solution was treated with a solution (1.17 g., 0.008 mole) of glycine ethyl ester hydrochloride in 25 ml. of acetonitrile containing 1.11 ml. of triethylamine. The reaction solution was maintained at 25° C. for 16 hours and was then evaporated to dryness under reduced pressure at 25° C. The residue was crystallized from 50 ml. of 0.5% aqueous sodium bicarbonate solution. The crystalline material was suspended in 50 ml. of 0.5% aqueous sodium bicarbonate solution, collected, washed successively with aqueous sodium bicarbonate solution and water, and dried under reduced pressure over anhydrous calcium sulfate. The resulting product, 5-(2-phenylhydrazide) of N-carbobenzyloxy-α-L-glutamylglycine ethyl ester, weighted 2.895 g. (77%) and melted at 162–165° C.

*Analysis.*—Calcd. for $C_{23}H_{28}N_4O_6$: C, 60.51; H, 6.18; N, 12.28. Found: C, 60.57; H, 5.94; N, 12.33.

E. 5-(2-PHENYLHYDRAZIDE) OF α-L-GLUTAMYLGLYCINE

A solution of 4.108 g. of 5-(2-phenylhydrozide) of N-carbobenzyloxy-α-L-glutamylglycine ethyl ester in 150 ml. of ethanol and 50 ml. of water was treated with 13.5 ml. of 2 N sodium hydroxide and the mixture was maintained at 25° C. for 2.5 hours. After adding 18 ml. of 1 N hydrochloric acid, the resulting solution was evaporated under reduced pressure. The residue was dissolved in 75 ml. of saturated aqueous sodium bicarbonate solution and the aqueous solution was extracted with three 50-ml. portions of ethyl acetate. The combined ethyl acetate extracts were extracted with two 50-ml. portions of saturated aqueous sodium bicarbonate solution. The combined sodium bicarbonate extracts and original sodium bicarbonate solution was acidified to Congo red with 6 N hydrochloric acid and extracted with three 200-ml. portions of ethyl acetate. The combined ethyl acetate extracts were washed with 500 ml. of 1 N hydrochloric acid and then with two 50-ml. portions of water. The washed ethyl acetate extract was dried over anhydrous sodium sulfate and evaporated under reduced pressure. The residue, 5-(2-phenylhydrazide) of N-carbobenzyloxy-α-L-glutamylglycine, was added to 150 ml. of methanol and 75 ml. of water and then hydrogenolyzed for 1 hour in the presence of 0.5 g. palladium-charcoal catalyst (10%) at 2 atmospheres pressure. The catalyst was removed by filtration and washed with 150 ml. of warm water. The combined filtrate and washings were evaporated under reduced pressure at 35° C. and the residue was crystallized from water-ethanol to yield 920 mg. of 5-(2-phenylhydrazide) of α-L-glutamylglycine which melted at 168–171° C. On recrystallization from water, the product melted at 168–171° C. (dec.).

*Analysis.*—Calcd. for $C_{13}H_{18}N_4O_4 \cdot \frac{1}{4}H_2O$: C, 52.25; H, 6.24; $H_2O$, 1.51. Found: C, 52.28; H, 6.07; $H_2O$, 1.25.

EXAMPLE 2

*5-(2-phenylhydrazide) of α-L-glutamyl-L-valine*

A. 5-(2-PHENYLHYDRAZIDE) OF N-CARBOBENZYLOXY-α-L-GLUTAMYL-L-VALINE METHYL ESTER

To a suspension of 7.598 g. (0.030 mole) of Woodward's Reagent K in 150 ml. of acetonitrile was added 11.142 g. (0.030 mole) of L-N-carbobenzyloxyglutamic acid 5-(2-phenylhydrazide) (Example 1, Part C) dissolved in 50 ml. of acetonitrile containing 4.16 ml. of triethylamine. The mixture was stirred at 25° C. for about 30 minutes until a clear solution resulted. To this solution was added a solution of L-valine methyl ester hydrochloride (5.03 g., 0.030 mole) in 50 ml. of acetonitrile containing 4.16 ml. of triethylamine. The resulting solution was stirred at 25° C. for 16 hours. The solvent was evaporated under reduced pressure at 25° C. and the residue was crystallized from 100 ml. of 0.5% aqueous sodium bicarbonate solution. The crystalline product was washed with 0.5% aqueous sodium bicarbonate solution and with water, then dried under reduced pressure over anhydrous calcium sulfate. The resulting product, 5-(2-phenylhydrazide) of N-carbobenzyloxy-α-L-glutamyl-L-valine methyl ester, weighed 11.59 g. (80%); melted at 130–138° C., resolidified, and remelted at 159° C. After recrystallization from 50% methanol the product melted at 125–130° C., resolidified, and remelted at 166–169° C.

*Analysis.*—Calcd. for $C_{25}H_{32}N_4O_6$: C, 61.96; H 6.66; N, 11.57. Found: C, 61.56; H, 6.14; N, 11.65.

B. 5-(2-PHENYLHYDRAZIDE) OF α-L-GLUTAMYL-L-VALINE

A solution of 4.86 g. of 5-(2-phenylhydrazide) of N-carbobenzyloxy-α-L-glutamyl-L-valine methyl ester in 100 ml. of ethanol and 50 ml. of water was treated with 15 ml. of 2 N sodium hydroxide and the mixture was maintained at 25° C. for 2 hours. After adding 20 ml. of 1 N hydrochloric acid, the solution was evaporated to a volume of 50 ml. under reduced pressure at 25–30° C. The concentrate was dissolved in 50 ml. of saturated aqueous sodium bicarbonate solution and the resulting solution was extracted with three 50-ml. portions of ethyl acetate. The combined ethyl acetate extracts were extracted with two 50-ml. portions of saturated aqueous sodium bicarbonate solution. The combined sodium bicarbonate extracts and original sodium bicarbonate solution were acidified to Congo red with 6 N hydrochloric acid and extracted with three 200-ml. portions of ethyl acetate. The combined ethyl acetate extracts were dried over anhydrous sodium sulfate and evaporated under reduced pressure at 25–30° C. The residue, 5-(2-phenylhydrazide) of N-carbobenzyloxy-α-L-glutamy-L-valine, in 100 ml. of methanol and 75 ml. of water, was hydrogenolyzed at 2 atmospheres pressure in the presence of 500 mg. of palladium-charcoal (10%) catalyst for 1 hour. The catalyst was removed by filtration and washed with 100 ml. of warm water. The combined filtrate and washings were evaporated under reduced pressure at 25–30° C. The residue, on crystallization from water-ethanol, yielded 1.82 g. of 5-(2-phenylhydrazide) of α-L-glutamyl-L-valine which melted at 158–160° C. On recrystallization from water-ethanol, the product melted at 158–160° C.

*Analysis.*—Calcd. for $C_{16}H_{24}$—$N_4$—$O_4 \cdot H_2O$: C, 54.22; H, 7.40; N, 15.81; $H_2O$, 5.08. Found: C, 53.99; H, 7.32; N, 15.48; $H_2O$, 5.36.

EXAMPLE 3

*5-(2-phenylhydrazide) of N-carbobenzyloxy-α-L-glutamylglycine methyl ester*

A solution of 743 mg. (0.002 mole) of L-N-carbobenzyloxyglutamic acid 5-(2-phenylhydrazide) (Example 1, Part C) in 25 ml. of acetonitrile containing 0.28 ml. (0.002 mole) of triethylamine was added to a suspension of 507 mg. (0.002 mole) of Woodward's Reagent K in 125 ml. of acetonitrile. The suspension was stirred at 25° C. for 5 hours until all material was in solution. Glycine methyl ester hydrochloride (251 mg., 0.002 mole) was added to the solution along with 0.28 ml. of triethylamine. The solution was stirred at 25° C. for 16 hours, then evaporated to dryness under reduced pressure at 35° C. The residue was washed with water, dried under reduced pressure and crystallized from ethyl acetate-Skellysolve B (Skellysolve B is essentially a mixture of hexanes having a boiling range of 140–160° F.). The crystalline material, 5-(2-phenylhydrazide) of N-carbobenzyloxy-α-L-glutamylglycine methyl ester (706 mg., 86%), after recrystallization from ethyl acetate-Skellysolve B melted at 164–166° C.

*Analysis.*—Calcd. for $C_{22}H_{26}N_4O_6$: C, 59.72; H, 5.92; N, 12.67; O, 21,69. Found: C, 59.42; H, 5.86; N, 12.61; O, 21.52.

EXAMPLE 4

*5-(2-phenylhydrazide) of α-L-glutamyl-L-leucine*

A. 5-(2-PHENYLHYDRAZIDE) OF N-CARBOBENZYLOXY-α-L-GLUTAMYL-L-LEUCINE ETHYL ESTER

To a suspension of 507 mg. (0.002 mole) of Woodward's Reagent K in 10 ml. of acetonitrile was added a solution of 743 mg. (0.002 mole) of L-N-carbobenzyloxyglutamic acid 5-(2-phenylhydrazide) (Example 1, Part C) in 10 ml. of acetonitrile containing 0.28 ml. (0.002 mole) of triethylamine. The mixture was stirred at 25° C. for about 30 minutes until a clear solution resulted. To this solution was added 391 mg. (0.002 mole) of L-leucine ethyl ester hydrochloride in 10 ml. of acetonitrile containing 0.28 ml. of triethylamine. The solution was stirred for 16 hours at 25° C. The solvent was evaporated under reduced pressure at 25° C. and the residue was crystallized from 50 ml. of 0.5% aqueous sodium bicarbonate solution. The crystalline product was washed with 0.5% aqueous sodium bicarbonate solution, then with water, and dried under reduced pressure over anhydrous calcium sulfate. The dried product, 5-(2-phenylhydrazide) of N-carbobenzyloxy-α L-glutamyl-L-leucine ethyl ester, weighed 740 mg. (74%) and melted at 146–153° C. After recrystallization from methanol-water the product melted at 154–157° C.

*Analysis.*—Calcd. for $C_{27}H_{36}N_4O_6$: C, 63.26; H, 7.08; N, 10.93. Found: C, 63.08; H, 6.68; N, 11.09.

B. 5-(2-PHENYLHYDRAZIDE) OF α-L-GLUTAMYL-L-LEUCINE

In the same manner as shown in Example 1, Part E, 5-(2-phenylhydrazide) of α-L-glutamyl-L-leucine was prepared by substituting 5-(2-phenylhydrazide) of N-carbobenzyloxy-α-L-glutamyl-L-leucine ethyl ester for 5-(2-phenylhydrazide) of N-carbobenzyloxy-α-L-glutamylglycine ethyl ester.

EXAMPLE 5

*5-(2-phenylhydrazide) of α-L-glutamyl-L-phenylalanine*

A. 5-(2-PHENYLHYDRAZIDE) OF N-CARBOBENZYLOXY-α-L-GLUTAMYL-L-PHENYLALANINE ETHYL ESTER

To a slurry of 507 mg. (0.002 mole) of Woodward's Reagent K in 10 ml. of acetonitrile was added 743 mg.

(0.002 mole) of L-N-carbobenzyloxyglutamic acid 5-(2-phenylhydrazide) (Example 1, Part C) in 10 ml. of acetonitrile containing 0.28 ml. (0.002 mole) of triethylamine. The mixture was stirred for about 30 minutes until a clear solution was obtained. To this solution was added 459 mg. (0.002 mole) of L-phenylalanine ethyl ester hydrochloride in 10 ml. of acetonitrile containing 0.28 ml. of triethylamine. The resulting solution was stirred at 25° C. for 16 hours. Solvent was evaporated under reduced pressure at 25° C. and the residue was crystallized from 50 ml. of water. The product was washed with 0.5% aqueous sodium bicarbonate solution, then with water, and dried under reduced pressure over anhydrous calcium sulfate. The dried product, 5-(2-phenylhydrazide) of N-carbobenzyloxy-α-L-glutamyl-L - phenylalanine ethyl ester, weighed 775 mg. (71%) and melted at 177–179° C.

*Analysis.*—Calcd. for $C_{30}H_{34}N_4O_6$: C, 65.85; H, 6.27; N, 10.27. Found: C, 65.43; H, 6.61; N, 10.22.

B. 5-(2-PHENYLHYDRAZIDE) OF α-L-GLUTAMYL-L-PHENYLALANINE

In the same manner as shown in Example 1, Part E, 5-(2-phenylhydrazide) of α-L-glutamyl-L-phenylalanine was prepared by substituting 5-(2-phenylhydrazide) of N-carbobenzyloxy-α-L-glutamyl-L-phenylalanine ethyl ester for 5-(2-phenylhydrazide) of N-carbobenzyloxy-α-L-glutamylglycine ethyl ester.

EXAMPLE 6

*5-(2-phenylhydrazide) of α-L-glutamyl-L-methionine*

A. 5-(2-PHENYLHYDRAZIDE) OF N-CARBOBENZYLOXY-α-L-GLUTAMYL-L-METHIONINE METHYL ESTER

A suspension of Woodward's Reagent K (1.266 g., 0.005 mole) in 50 ml. of acetonitrile was treated with a solution of 1.855 g. (0.005 mole) of L-N-carbobenzyloxyglutamic acid 5-(2-phenylhydrazide) (Example 1, Part C) in 50 ml. of acetonitrile containing 0.70 ml. (0.005 mole) of triethylamine. The mixture was stirred for 30 minutes and the resulting solution was treated with 0.999 g. (0.006 mole) of L-methionine methyl ester hydrochloride in 20 ml. of acetonitrile containing 0.70 ml. of triethylamine. The solution was stirred at 25° C. for 16 hours. Solvent was evaporated under reduced pressure at 25° C. The residue was crystallized from 50 ml. of 0.5% aqueous sodium bicarbonate solution and the crystalline product was recovered by filtration and suspended in 50 ml. of warm 0.5% aqueous sodium bicarbonate solution. It was re-collected, washed with aqueous sodium bicarbonate solution and then with water, and dried under reduced pressure over anhydrous calcium sulfate. The dried product, 5-(2-phenylhydrazide) of N-carbobenzyloxy-α-L-glutamyl-L-methionine methyl ester, weighed 1.880 g. (73%) and melted at about 165° C. After recrystallization from ethanol-water the product melted at 164–168° C.

*Analysis.*—Calcd. for $C_{25}H_{32}N_4O_6S$: C, 58.12; H, 6.24; N, 10.85; S, 6.21. Found: C, 58.00; H, 6.05; N, 10.93; S, 5.90.

B. 5-(2-PHENYLHYDRAZIDE) OF α-L-GLUTAMYL-L-METHIONINE

In the same manner as shown in Example 1, Part E, 5-(2-phenylhydrazide) of α-L-glutamyl-L-methionine was prepared by substituting 5-(2-phenylhydrazide) of N-carbobenzyloxy-α-L-glutamyl-L-methionine methyl ester for 5-(2-phenylhydrazide) of N-carbobenzyloxy-α-L-glutamylglycine ethyl ester.

EXAMPLE 7

*5-(2-p-tolylhydrazide) of α-L-glutamyl-L-methionine*

A. L-N-CARBOBENZYLOXYGLUTAMIC ACID 5-(2-p-TOLYLHYDRAZIDE)

An ether solution of L-N-carbobenzyloxyglutamic acid 5-azide was prepared from 21.5 g. of L-N-carbobenzlyoxyglutamic acid 5-hydrazide in the manner described in Example 1, Parts A and B, and stored in an acetone-solid carbon dioxide bath. The solution was added, over a period of one hour, to a stirred solution of 18.3 g. (0.15 mole) of p-tolylhydrazine in 250 ml. of ether. During the addition of the azide solution, the p-tolylhydrazine solution was cooled in an ice bath. The ice bath was removed and the reaction mixture was kept at 25° C. for 22 hours. The precipitate which formed was collected, washed well with ether, and dissolved in a mixture of 1.0 l. of methylene chloride and 500 ml. of 1 N hydrochloric acid. The aqueous layer was separated and extracted with four 1.0 l. portions of methylene chloride. The methylene chloride extracts were washed with 500 ml. of 1 N hydrochloric acid and with two 500-ml. portions of water. The combined methylene chloride extracts and original methylene chloride layer were evaporated under reduced pressure at 36° C. The residue was crystallized from 75% methanol to yield 15.0 g. of L-N-carbobenzyloxyglutamic acid 5-(2-tolylhydrazide). Upon recrystallization from methanol-ether, then from 80% ethanol, an analytical sample which was solvated with ethanol had a melting point of 153–155° C.

*Analysis.*—Calcd. for $C_{20}H_{23}N_3O_5 \cdot CH_3CH_2OH$: C, 61.24; H, 6.77; N, 9.74. Found: C, 61.16; H, 6.18; N, 10.01.

B. 5-(2-p-TOLYLHYDRAZIDE) OF N-CARBOBENZYLOXY-α-L-GLUTAMYL-L-METHIONINE METHYL ESTER

A solution of 3.854 g. (0.010 mole) of L-N-carbobenzyloxyglutamic acid 5-(2-p-tolylhydrazide) in 25 ml. of acetonitrile containing 1.39 ml. (0.10 mole) of triethylamine was added to a suspension of 2.533 g. (0.010 mole) of Woodward's Reagent K in 50 ml. of acetonitrile. The mixture was stirred until a clear solution was obtained, then treated with a suspension of 2.00 g. (0.010 mole) of L-methionine methyl ester hydrochloride in 140 ml. of acetonitrile containing 1.39 ml. of triethylamine. The resulting solution was stirred for 16 hours. The solvent was evaporated under reduced pressure at 25° C. and the residue was crystallized from 100 ml. of 0.5% aqueous sodium bicarbonate solution. The product was washed with aqueous sodium bicarbonate solution and then with water, and dried over anhydrous calcium sulfate under reduced pressure. The dried product, 5-(2-p-tolylhydrazide) of N-carbobenzyloxy-α-L-glutamyl-L-methionine methyl ester, weighed 4.51 g. (85%) and melted at about 180° C. On recrystallization from methanol-water the product melted at 190–193° C.

*Analysis.*—Calcd. for $C_{26}H_{34}N_4O_6S$: C, 58.84; H, 6.46; N, 10.56; S, 6.04. Found: C, 58.88; H, 6.20; N, 10.62; S, 5.71.

C. 5-(2-p-TOLYLHYDRAZIDE)-OF α-L-GLUTAMYL-L-METHIONINE

In the same manner as shown in Example 1, Part E, 5-(2-p-tolylhydrazide) of α-L-glutamyl-L-methionine was prepared by substituting 5-(2-p-tolylhydrazide) of N-carbobenzyloxy-α-L-glutamyl-L-methionine methyl ester for 5-(2-phenylhydrazide) of N-carbobenzyloxy-α-L-glutamylgylcine ethyl ester.

EXAMPLE 8

*5-[2-(α-hydroxy-p-tolylhydrazide)] of α-L-glutamyl-L-tyrosine*

A. p-CARBOMETHOXYPHENYLHYDRAZINE

A solution of 20.0 g. of p-carboxyphenylhydrazine in 200 ml. of absolute methanol and 20 ml. of concentrated sulfuric acid was heated under reflux for one hour. The solution was concentrated under reduced pressure to a volume of 75 ml. and 400 g. of ice was added to the residue. The resulting solution was cooled to −10° C. in an ice-salt bath while being treated with 30% aqueous sodium hydroxide solution. The product crystallized when the solution became strongly alkaline and the crystallized product was promptly collected on a funnel and washed with ice-water until neutral. The dried product weighed 14.3 g. (66%). On recrystallization from ether, with charcoal treatment, the product, p-carbomethoxyphenylhydrazine, melted at 110° C. (dec.).

*Analysis.*—Calcd. for $C_8H_{10}N_2O_2$: N, 16.86. Found: N, 16.78.

B. α-HYDROXY-p-TOLYLHYDRAZINE

A solution of 2.08 g. (0.0125 mole) of p-carbomethoxyphenylhydrazine in 125 ml. of ether (freshly distilled over lithium aluminum hydride) was added to a boiling suspension of lithim aluminum hydride (1.00 g.) in 25 ml. of dry ether over a period of 10 minutes. The reaction mixture was stirred under reflux for 1.5 hours, then allowed to remain at 25° C. for 30 minutes. The apparatus was flushed with nitrogen while 5 ml. of saturated sodium chloride solution was added in one portion. Inorganic salts were collected by filtration of the mixture, resuspended in ether with anhydrous sodium sulfate, and again collected and washed with ether. The combined filtrates and washings were immediately cooled in an ice bath. The product in ether solution was α-hydroxy-p-tolylhydrazine (p-methylolphenylhydrazine).

C. L-N-CARBOBENZYLOXYGLUTAMIC ACID 5-AZIDE

A solution of 1.77 g. (0.006 mole) of L-N-carbobenzyloxyglutamic acid 5-hydrazide in 25 ml. of 3 N HCl was cooled in an ice bath and then covered with 150 ml. of cold (−10° C.) ether. The cold mixture was stirred while being treated with a cold solution of 0.580 g. (0.008 mole) of sodium nitrite in 25 ml. of water over a period of 10 minutes. The lower layer was separated and extracted with two 100-ml. portions of cold (−10° C.) ether. The ether extracts containing L-N-carbobenzyloxyglutamic acid 5-azide were washed with two 75-ml. portions of ice water, then combined and stored in an acetone-solid carbon dioxide bath.

D. L-N-CARBOBENZYLOXYGLUTAMIC ACID 5-[2-(α-HYDROXY-p-TOLYL)HYDRAZIDE]

The washed ether extracts of Part C were added to the ether solution of α-hydroxy-p-tolylhydrazine of Part B over a period of 60 minutes. The reaction mixture was stirred in an ice bath under nitrogen and then was maintained at a temperature of 25° C. for two hours. The resulting product in ether solution was L-N-carbobenzyloxyglutamic acid 5-[2-(α-hydroxy-p-tolyl)hydrazide].

E. 5-[2-(α-HYDROXY-p-TOLYL)HYDRAZIDE] OF N-CARBOBENZLOXY-α-L-GLUTAMYL - L - TRYOSINE PROPYL ESTER

In the same manner as shown in Example 1, Part D, 5-[2-(α-hydroxy-p-tolyl)hydrazide] of N-carbobenzyloxy-α-L-glutamyl-L-tyrosine propyl ester was prepared by substituting L-N-carbobenzyloxyglutamic acid 5-[2-(α-hydroxy-p-tolyl)hydrazide] and L-tyrosine propyl ester hydrochloride for L-N-carbobenzyloxyglutamic acid 5-(2-phenylhydazide) and glycine ethyl ester hydrochloride, respectively.

F. 5-[2-(α-HYDROXY-p-TOLYL)HYDRAZIDE] OF α-L-GLUTAMYL-L-TRYOSINE

In the same manner as shown in Example 1, Part E, 5-[2-(α-hydroxy-p-tolyl)hydrazide] of α-L-glutamyl-L-tyrosine was prepared by substituting 5-[2-(α-hydroxy-p-tolyl)hydrazide] of N-carbobenzyloxy-α-L-glutamyl-L-tyrosine propyl ester for 5-(2-phenylhydrazide) of N-carbobenzyloxy-α-L-glutamylglycine ethyl ester.

EXAMPLE 9

4-[2-(α-hydroxy-p-tolyl)hydrazide] of α-L-aspartyl-L-alanine

A. L-N-CARBOBENZYLOXYASPARTIC ACID 4-HYDRAZIDE

In the same manner as shown in Example 1, Part A, L-N-carbobenzyloxyaspartic acid 4-hydrazide was prepared by substituting 4-methyl L-aspartate for 5-methyl L-glutamate.

B. L-N-CARBOBENZYLOXYASPARTIC ACID 4-[2-(α-HYDROXY-p-TOLYL)-HYDRAZIDE]

In the same manner as shown in Example 8, Parts A, B, C and D, L-N-carbobenzyloxyaspartic acid 4-[2-(α-hydroxy-p-tolyl)hydrazide] was prepared by substituting L-N-carbobenzyloxyaspartic acid 4-hydrazide for L-N-carbobenzyloxyglutamic acid 5-hydrazide.

C. 4-[2-(α-HYDROXY-p-TOLYL)HYDRAZIDE] OF N-CARBOBENZYLOXY-α-L-ASPARTYL - L - ALANINE ETHYL ESTER

In the same manner as shown in Example 1, Part D, 4-[2-(α-hydroxy-p-tolyl)hydrazide] of N-carbobenzyloxy-α-L-aspartyl-L-alanine ethyl ester was prepared by substituting L-N-carbobenzyloxyaspartic acid 4-[2-(α-hydroxy-p-tolyl)hydrazide] and L-alanine ethyl ester hydrochloride for L-N-carbobenzyloxyglutamic acid 5-(phenylhydrazide) and glycine ethyl ester hydrochloride, respectively.

D. 4-[2-(α-HYDROXY-p-TOLYL)HYDRAZIDE] OF α-L-ASPARTYL-L-ALANINE

In the same manner as shown in Example 1, Part E, 4-[2-(α-hydroxy-p-tolyl)hydrazide] of α-L-aspartyl-L-alanine was prepared by substituting 4-[2-(α-hydroxy-p-tolyl)hydrazide] of N-carbobenzyloxy-α-L-aspartyl-L-alanine ethyl ester for 5-(2-phenylhydrazide) of N-carbobenzyloxy-α-L-glutamylglycine ethyl ester.

EXAMPLE 10

5-(2-p-carboxyphenylhydrazide) of α-L-glutamyl-L-proline

In the same manner as shown in Example 1, 5-(2-p-carboxyphenylhydrazide) of α-L-glutamyl-L-proline was prepared by substituting L-proline methyl ester hydrochloride and p-carboxyphenylhydrazine for glycine ethyl ester hydrochloride and phenylhydrazine, respectively, to produce 5-(2-p-carboxyphenylhydrazide) of N-carbobenzyloxy-α-L-glutamyl-L-proline methyl ester, saponifying the latter and subjecting the saponified product to hydrogenolysis.

EXAMPLE 11

5-(2-p-chlorophenylhydrazide) of α-L-glutamyl-L-leucine

In the same manner as shown in Example 1, 5-(2-p-chlorophenylhydrazide) of α-L-glutamyl-L-leucine was prepared by substituting L-leucine propyl ester hydrochloride and p-chlorophenylhydrazine for glycine ethyl ester hydrochloride and phenylhydrazine, respectively, to produce 5-(2-p-chlorophenyl hydrazide) of N-carbobenzyloxy-α-L-glutamyl-L-leucine propyl ester, saponifying the latter and subjecting the saponifed product to hydrogenolysis.

Similarly, 5-(2-p-bromophenylhydrazide) of N-carbobenzyloxy-α-L-glutamyl-L-valine methyl ester, 5-(2-o-bromophenylhydrazide of N-carbobenzyloxy-α-L-glutamylglycine methyl ester, 5-(2-p-iodophenylhydrazide) of N-carbobenzyloxy-α-L-glutamyl-L-leucine butyl ester, 5-[2-(3,5-dichlorophenyl)hydrazide] of N-carbobenzyloxy-α-L-glutamyl-L-phenylalanine ethyl ester were prepared by substituting p-bromophenylhydrazine and L-valine methyl hydrochloride; o-bromophenylhydrazine and glycine methyl ester hydrochloride; p-iodophenylhydrazine and L-leucine butyl ester hydrochloride; and 3,5-dichlorophenylhydrazine and L-phenylalanine ethyl ester hydrochloride for p-chlorophenylhydrazine and L-leucine propyl ester hydrochloride, respectively. On saponifying the thus-produced compounds and subjecting the saponified product to hydrogenolysis, 5-(2-p-bromophenylhydrazide) of α-glutamyl-L-valine, 5-(2-o-bromophenylhydrazide) of α-L-glutamylglycine, 5-(2-p-iodophenylhydrazide) of α-L-glutamyl-L-leucine and 5-[2-(3,5-dichlorophenyl)hydrazine] of α-L-glutamyl-L-phenylalanine, respectively, were prepared.

EXAMPLE 12

*2-o-methoxyphenylhydrazide of aminomalonyl-L-serine*

In the same manner as shown in Example 1, 2-o-methoxy-phenylhydrazide of aminomalonyl-L-serine was prepared by substituting methyl aminomalonate, o-methoxyphenylhydrazine and L-serine propyl ester hydrochloride for 5-methyl L-glutamate, phenylhydrazine, and glycine ethyl ester hydrochloride, respectively, to produce 2-o-methoxyphenylhydrazide of N-carbobenzyloxy-aminomalonyl-L-serine propyl ester, saponifying the latter and subjecting the saponified product to hydrogenolysis.

Similarly, 2-o-chlorophenylhydrazide of N-carbobenzyloxy-aminomalonyl-L-tyrosine propyl ester and 2-o-chlorophenylhydrazide of aminomalonyl-L-tyrosine; 2-o-tolylhydrazide of N-carbobenzyloxy-aminomalonyl-L-proline ethyl ester and 2-o-tolylhydrazide of aminomalonyl-L-proline; 2-p-propoxyphenylhydrazide of N-carbobenzyloxy-aminomalonyl-L-leucine benzyl ester and 2-p-propoxyphenylhydrazide of aminomalonyl-L-leucine; 2-p-iodophenylhydrazide of N-carbobenzyloxy-aminomalonyl-L-valine butyl ester and 2-p-iodophenylhydrazide of aminomalonyl-L-valine were prepared by substituting o-chlorophenylhydrazine and L-tyrosine propyl ester hydrochloride; o-tolylhydrazine and L-proline ethyl ester hydrochloride; p-propoxyphenylhydrazine and L-leucine benzyl ester hydrochloride; and p-iodophenylhydrazine and L-valine butyl ester hydrochloride for o-methoxyphenylhydrazine and L-serine propyl ester hydrochloride, respectively.

Substituting allyl chloroformate and p-toluenesulfonyl chloride for benzyl chloroformate in Example 12, results in the production of 2-o-methoxyphenylhydrazide of N-carboallyloxyaminomalonyl-L-serine propyl ester and 2-o-methoxyphenylhydrazide of N-tosyl-aminomalonyl-L-serine propyl ester; 2-o-chlorophenylhydrazide of N-carboallyloxy-aminomalonyl-L-tyrosine propyl ester and 2-o-chlorophenylhydrazide of N-tosyl-aminomalonyl-L-tyrosine propyl ester; 2-o-tolylhydrazide of N-carboallyloxy-aminomalonyl-L-proline ethyl ester and 2-o-tolylhydrazide of N-tosylaminomalonyl-L-proline ethyl ester; 2-p-propoxyphenylhydrazide of N-carboallyloxy-aminomalonyl-L-leucine benzyl ester and 2-p-propoxyphenylhydrazide of N-t-osyl-aminomalonyl-L-leucine benzyl ester; 2-p-iodophenylhydrazide of N-carboallyloxy-aminomalonyl-L-valine butyl ester and 2-p-iodophenylhydrazide of N-tosylaminomalonyl-L-valine butyl ester, respectively.

EXAMPLE 13

*4-(2-p-ethoxyphenylhydrazide) of α-L-aspartyl-L-tryptophan*

A. 4-(2-p-ETHOXYPHENYLHYDRAZIDE) OF N - CARBOALLYLOXY-α-L-ASPARTYL-L-TRYPTOPHAN p - NITROPHENYL ESTER

In the same manner as shown in Example 1, Parts A, B, C and D, 4-(2-p-ethoxyphenylhydrazide) of N-carboallyloxy-α-L-aspartyl-L-tryptophan p-nitrophenyl ester was prepared by substituting allyl chloroformate, 4-methyl L-aspartate, p-ethoxyphenylhydrazine and L-tryptophan p-nitrophenyl ester hydrochloride for benzyl chloroformate, 5-methyl L-glutamate, phenylhydrazine, and glycine ethyl ester hydrochloride, respectively.

B. 4-(2-p-ETHOXYPHENYLHYDRAZIDE) OF α-L-ASPARTYL-L-TRYPTOPHAN 4-(2-p-ethoxyphenylhydrazide) of N-carboallyloxy-α-L-aspartyl-L-tryptophan p-nitrophenyl ester was saponified with sodium hydroxide and the saponified product was hydrogenolyzed in the presence of platinum oxide catalyst in acidified ethanol in accordance with the procedure described in J. Amer. Chem. Soc. 79, 637–39, 1957, to produce 4-(2-p-ethoxyphenylhydrazide) of α-L-aspartyl-L-tryptophan.

Similarly, 4-(2-p-ethoxyphenylhydrazide) of N-carboallyloxy-α-D-aspartyl-L-tryptophan p-nitrophenyl ester and 4-(2-p-ethoxyphenylhydrazide) of α-D-aspartyl-L-tryptophan; 4-(2-p-ethoxyphenylhydrazide) of N-carboallyloxy-α-D,L-aspartyl-L-tryptophan p-nitrophenyl ester and 4-(2-p-ethoxyphenylhydrazide) of α-D,L-aspartyl-L-tryptophan, respectively, were prepared by substituting 4-methyl D-aspartate and 4-methyl D,L-aspartate, respectively, for 4-methyl L-aspartate.

EXAMPLE 14

*4-(2-m-propoxyphenylhydrazide) of α-3,3-dimethylaspartyl-L-serine*

A. 4-(2-m-PROPOXYPHENYLHYDRAZIDE) OF N-TOSYL-α-3,3-DIMETHYLASPARTYL-L-SERINE BENZYL ESTER

In the same manner as shown in Example 1, Parts A, B, C and D, 4-(2-m-propoxyphenylhydrazide) of N-tosyl-α,3,3-dimethylaspartyl-L-serine benzyl ester was prepared by substituting p-toluenesulfonyl chloride, 4-methyl 3,3-dimethylaspartate, m-propoxyphenylhydrazine, and L-serine benzyl ester hydrochloride for benzyl chloroformate, 5-methyl L-glutamate, phenylhydrazine, and glycine ethyl ester hydrochloride, respectively.

B. 4-(2-m-PROPOXYPHENYLHYDRAZIDE) OF α-3,3-DIMETHYLASPARTYL-L-SERINE 4-(2-m-propoxyphenylhydrazide) of N-tosyl-α-3,3-dimethylaspartyl-L-serine benzyl ester was saponified with sodium hydroxide and the saponified product was reacted with sodium and liquid ammonia in accordance with the procedure described in J. Amer. Chem. Soc. 79, 639–44, 1957, to produce 4-(2-m-propoxyphenylhydrazide) of α-3,3-dimethylaspartyl-L-serine.

Similarly, 4-(2-p-iodophenylhydrazide) of N-tosyl-α-3,3-dimethylaspartyl-L-phenylalanine p-nitrobenzyl ester and 4-(2-p-iodophenylhydrazide) of α-3,3-dimethylaspartyl-L-phenylalanine were prepared by substituting p-iodophenylhydrazine and L-phenylalanine p-nitrobenzyl ester hydrochloride for m-propoxyphenylhydrazine and L-serine benzyl ester hydrochloride, respectively.

EXAMPLE 15

*4-[2-(3,4,5-trimethoxyphenyl)hydrazide] of α-2-propylaspartyl-L-methionine*

In the same manner as shown in Example 1, Parts A, B, C and D, 4-[2-(3,4,5-trimethoxyphenyl)hydrazide] of α-2-propylaspartyl-L-methionine was prepared by substituting 4-methyl 2-propylaspartate, 3,4,5-trimethoxyphenylhydrazine, and L-methionine methyl ester hydrochloride for 5-methyl L-glutamate, phenylhydrazine, and glycine ethyl ester hydrochloride, respectively, to produce 4-[2-(3,4,5-trimethoxyphenyl)hydrazide] of N-carbobenzyloxy-α-2-propylaspartyl-L-methionine methyl ester, saponifying the latter, and subjecting the saponified product to hydrogenolysis.

EXAMPLE 16

*4-(2-p-ethylphenylhydrazide) of α-3-butylaspartyl-L-tryptophan*

In the same manner as shown in Example 1, Parts A, B, C and D, 4-(2-p-ethylphenylhydrazide) of α-3-butylaspartyl-L-tryptophan was prepared by substituting 4-methyl 3-butylaspartate, p-ethylphenylhydrazine, and L-tryptophan benzyl ester hydrochloride for 5-methyl L-glutamate, phenylhydrazine, and glycine ethyl ester hydrochloride, respectively, to produce 4-(2-p-ethylphenylhydrazide) of N-carbobenzyloxy-α-3-butylaspartyl-L-tryptophan benzyl ester, saponifying the latter and subjecting the saponified product to hydrogenolysis.

EXAMPLE 17

*4-(2-p-propylphenylhydrazide) of α-3-methylaspartyl-L-tyrosine*

A. 4-(2-p-PROPYLPHENYLHYDRAZIDE) OF N - TOSYL-α-3-METHYLASPARTYL-L-TYROSINE ETHEL ESTER

In the same manner as shown in Example 1, Parts A, B, C and D, 4-(2-p-propylphenylhydrazide) of N-tosyl-α-3- methylaspartyl-L-tyrosine ethyl ester was prepared by substituting p-toluenesulfonyl chloride, 4-methyl 3-methylaspartate, p-propylphenylhydrazine, and L-tyrosine ethyl ester hydrochloride for benzyl chloroformate, 5-methyl L-glutamate, phenylhydrazine, and glycine ethyl ester hydrochloride, respectively.

B. 4-(2-p-PROPYLPHENYLHYDRAZIDE) OF α-3-METHYLASPARTYL-L-TYROSINE 4-(2-p-propylphenylhydrazide) of N-tosyl-α-3-methylaspartyl-L-tyrosine ethyl ester was saponified with sodium hydroxide and the saponified product was reacted with sodium and liquid ammonia in accordance with the procedure described in J. Amer. Chem. Soc. 79, 639–44, 1957, to produce 4-(2-p-propylphenylhydrazide) of α-3-methylaspartyl-L-tyrosine.

EXAMPLE 18

5-(2-p-butylphenylhydrazide) of α-2-methylglutamyl-L-phenylalanine

A. 5-(2-p-BUTYLPHENYLHYDRAZIDE) OF N-CARBOALLYLOXY-α-2-METHYLGLUTAMYL-L-PHENYLALANINE p-NITROBENZYL ESTER

In the same manner as shown in Example 1, Parts A, B, C and D, 5-(2-p-butylphenylhydrazide) of N-carboallyloxy-α-2-methylglutamyl-L-phenylalanine p-nitrobenzyl ester was prepared by substituting allyl chloroformate, 5-methyl 2-methylglutamate, p-butylphenylhydrazine, and L-phenylalanine p-nitrobenzyl ester hydrochloride for benzyl chloroformate, 5-methyl L-glutamate, phenylhydrazine, and glycine ethyl ester hydrochloride, respectively.

B. 5-(2-p-BUTYLPHENYLHYDRAZIDE) OF α-2-METHYLGLUTAMYL-L-PHENYLALANINE 5-(2-p-butylphenylhydrazide) of N-carboallyloxy-α-2-methylglutamyl-L-phenylalanine p-nitrobenzyl ester was saponified with sodium hydroxide and the saponified product was hydrogenolyzed in the presence of platinum oxide catalyst in acidified ethanol in accordance with the procedure described in J. Amer. Chem. Soc. 79, 637–39, 1957, to produce 5-(2-p-butylphenylhydrazide) of α-2-methylglutamyl)-L-phenylalanine.

EXAMPLE 19

5-(2-o-isopropylphenylhydrazide) of α-3-methylglutamyl-L-isoleucine

A. 5-(2-o-ISOPROPYLPHENYLHYDRAZIDE) OF N-CARBOALLYLOXY-3-METHYLGLUTAMYL-L-ISOLEUCINE AMYL ESTER

In the same manner as shown in Example 1, Parts A, B, C and D, 5-(2-o-isopropylphenylhydrazide) of N-carboallyloxy-3-methylglutamyl-L-isoleucine amyl ester was prepared by substituting allyl chloroformate, 5-methyl 3-methylglutamate, o-isopropylphenylhydrazine, and L-isoleucine amyl ester hydrochloride for benzyl chloroformate, 5-methyl L-glutamate, phenylhydrazine, and glycine ethyl ester hydrochloride, respectively.

B. 5-(2-o-ISOPROPYLPHENYLHYDRAZIDE) OF α-3-METHYLGLUTAMYL-L-ISOLEUCINE 5-(2-o-isopropylphenylhydrazide) of N-carboallyloxy-3-methylglutamyl-L-isoleucine amyl ester was saponified with sodium hydroxide and the saponified product was hydrogenolyzed in the presence of platinum oxide catalyst in acidified ethanol in accordance with the procedure described in J. Amer. Chem. Soc. 79, 637–39, 1957, to produce 5-(2-o-isopropylphenylhydrazide) of α-3-methylglutamyl-L-isoleucine.

EXAMPLE 20

5-(2-phenylhydrazide) of α-4-methylglutamyl-L-cysteine

A. 5-(2-PHENYLHYDRAZIDE) OF N-TOSYL-α-4-METHYLGLUTAMYL-L-CYSTEINE ETHYL ESTER

In the same manner as shown in Example 1, Parts A, B, C and D 5-(2-phenylhydrazide) of N-tosyl-α-4-methylglutamyl-L-cysteine ethyl ester was prepared by substituting p-toluenesulfonyl chloride, 5-methyl 4-methylglutamate and L-cysteine ethyl ester hydrochloride for benzyl chloroformate, 5-methyl-L-glutamate and glycine ethyl ester hydrochloride, respectively.

B. 5-(2-PHENYLHYDRAZIDE) OF α-4-METHYLGLUTAMYL-L-CYSTEINE 5-(2-phenylhydrazide) of N-tosyl-α-4-methylglutamyl-L-cysteine ethyl ester was saponified with sodium hydroxide and the saponified product was reacted with sodium and liquid ammonia in accordance with the procedure described in J. Amer. Chem. Soc. 79, 639–44, 1957, to produce 5-(2-phenylhydrazide) of α-4-methylglutamyl-L-cysteine.

EXAMPLE 21

6-(2-p-chlorophenylhydrazide) of α-2-aminohexanedioyl-L-threonine

A. 6-(2-p-CHLOROPHENYLHYDRAZIDE) OF N-CARBOALLYLOXY-α-2-AMINOHEXANEDIOYL-L-THREONINE BENZYL ESTER

In the same manner as shown in Example 1, Parts A, B, C and D 6-(2-p-chlorophenylhydrazide) of N-carboallyloxy-α-2-aminohexanedioyl-L-threonine benzyl ester was prepared by substituting allyl chloroformate, 6-methyl 2-aminohexanedioate, p-chlorophenylhydrazine, and L-threonine benzyl ester hydrochloride for benzyl chloroformate, 5-methyl L-glutamate, phenylhydrazine, and glycine ethyl ester hydrochloride, respectively.

B. 6-(2-p-CHLOROPHENYLHYDRAZIDE) OF α-2-AMINOHEXANEDIOYL-L-THREONINE 6-(2-p-chlorophenylhydrazide) of N-carboallyloxy-α-2-aminohexanedioyl-L-threonine benzyl ester was saponified with sodium hydroxide and the saponified product was hydrogenolyzed in the presence of platinum oxide catalyst in acidified ethanol in accordance with the procedure described in J. Amer. Chem. Soc. 79, 637–39, 1957, to produce 6-(2-p-chlorophenylhydrazide) of α-2-aminohexanedioyl-L-threonine.

Similarly, 6-(2-o-ethylphenylhydrazide) of N-carboallyloxy-α-2-aminohexanedioyl-L-serine ethyl ester and 6-(2-o-ethyl-phenylhydrazide) of α-2-aminohexanedioyl-L-serine; 6-(2-m-propoxyphenylhydrazide) of N-carbollyloxy-α-2-aminohexanedioyl-L-valine methyl ester and 6-(2-m-propoxyphenylhydrazide) of α-2-aminohexanedioyl-L-valine; 6-(2-m-fluorophenylhydrazide) of N-carboallyloxy-α-2-aminohexanedioyl-L-tyrosine p-nitrophenyl ester and 6-(2-m-fluorophenylhydrazide) of α-2-aminohexanedioyl-L-tyrosine, were prepared by substituting o-ethylphenylhydrazine and L-serine ethyl ester hydrochloride; m-propoxyphenylhydrazine and L-valine methyl ester hydrochloride; m-fluorophenylhydrazine and L-tyrosine p-nitrophenyl ester hydrochloride for p-chlorophenyl) hydrazine and L-threonine benzyl ester hydrochloride, respectively.

Substituting benzyl chloroformate and p-toluenesulfonyl chloride for allyl chloroformate in Example 21 results in the production of 6-(2-p-chlorophenylhydrazide) of N-carbobenzyloxy-α-2-aminohexanedioyl-L-threonine benzyl ester and 6-(2-p-chlorophenylhydrazide) of N-tosyl-α-2-aminohexanedioyl-L-threonine benzyl ester; 6-(2-o-ethylphenylhydrazide) of N-carbobenzyloxy-α-2-aminohexanedioyl-L-serine ethyl ester and 6-(2-o-ethylphenylhydrazide) of N-tosyl-α-2-aminohexanedioyl-L-serine ethyl ester; 6-(2-m-propoxyphenylhydrazide) of N-carbobenzyloxy-α-2-aminohexanedioyl-L-valine methyl ester and 6-(2-m-propoxyphenylhydrazide) of N-tosyl-α-2-aminohexanedioyl-L-valine methyl ester; 6-(2-m-fluorophenylhydrazide) of N-carbobenzyloxy-α-2-aminohexanedioyl-L-tyrosine p-nitrophenyl ester and 6-(2-m-fluorophenylhydrazide) of N-tosyl-α-2-aminohexanedioyl-L-tyrosine p-nitrophenyl ester.

EXAMPLE 22

7-(2-p-methylolphenylhydrazide) of α-2-amino-heptanedioyl-L-hydroxyproline

A. 7-(2-p-METHYLOLPHENYLHYDRAZIDE) OF N-CARBO-ALLYLOXY-α-2-AMINOHEPTANEDIOYL - L - HYDROXY-PROLINE PHENYL ESTER

In the same manner as shown in Example 1, Parts A, B, C and D, 7-(2-p-methylolphenylhydrazide) of N-carboallyloxy - α - 2 - aminoheptanedioyl-L-hydroxyproline phenyl ester was prepared by substituting allyl chloroformate, 7 - methyl 2-aminoheptanedioate, p-methylolphenylhydrazine, and L-hydroxyproline phenyl ester hydrochloride for benzyl chloroformate, 5-methyl L-glutamate, phenylhydrazine, and glycine ethyl ester hydrochloride, respectively.

B. 7-(2-p-METHYLOLPHENYLHYDRAZIDE) OF α-2-AMINOHEPTANEDIOYL-L-HYDROXYPROLINE 7-(2-p-methylolphenylhydrazide) of N-carboallyloxy-α-2-aminoheptanedioyl - L - hydroxyproline phenyl ester was saponified with sodium hydroxide and the saponified product was hydrogenolyzed in the presence of platinum oxide catalyst in acidified ethanol in accordance with the procedure described in J. Amer. Chem. Soc. 79, 637–39, 1957, to produce 7-(2-p-methylolphenylhydrazide) of α-2-aminoheptanedioyl-L-hydroxyproline.

Similarly, 7-(2-p-tolylhydrazide) of N-carboallyloxy-α-2-aminoheptanedioyl-L-methionine benzyl ester and 7-(2-p - tolylhydrazide) of α-2-aminoheptanedioyl-L-methionine; 7-(2-p-propoxyphenylhydrazide) of N-carboallyloxy-α-2-aminoheptanedioyl-L-threonine propyl ester and 7-(2-p-propoxyphenylhydrazide) of α - 2 - aminoheptanedioyl-L-threonine; 7-(2-p-chlorophenylhydrazide) of N-carboallyloxy-α-2-aminoheptanedioyl-L-tryptophan ethyl ester and 7-(2-p-chlorophenylhydrazide) of α-2-aminoheptanedioyl-L-trytophan, were prepared by substituting p-tolylhydrazine and L-methionine benzyl ester hydrochloride; p-propoxyphenylhydrazine and L-threonine propyl ester hydrochloride; and p-chlorophenylhydrazine and L-tryptophan ethyl ester hydrochloride for p-methylolphenylhydrazine and L-hydroxyproline phenyl ester hydrochloride, respectively.

Substituting benzyl chloroformate and p-toluenesulfonyl chloride for allyl chloroformate in Example 22 results in the production of 7-(2-p-methylolphenylhydrazide) of N-carbobenzyloxy - α - 2 - aminoheptanedioyl-L-hydroxyproline ethyl ester and 7-(2-p-methylolphenylhydrazide) of N - tosyl-α-2-aminoheptanedioyl-L-hydroxyproline phenyl ester; 7-(2-p-tolylhydrazide) of N-carbobenzyloxy-α-2-aminoheptanedioyl-L-methionine benzyl ester and 7-(2-p-tolylhydrazide) of N-tosyl-α-2-aminoheptanedioyl-L-methionine benzyl ester; 7 - (2 - propoxyphenylhydrazide) of N-carbobenzyloxy-α-2-aminoheptanedioyl-L-threonine propyl ester and 7-(2-p-propoxyphenylhydrazide) of N-tosyl-α-2-aminoheptanedioyl - L - threonine propyl ester; 7-(2-p-chlorophenylhydrazide) of N-carbobenzyloxy-α-2-aminoheptanedioyl - L - tryptophan ethyl ester and 7-(2-p-chlorophenylhydrazide) of N-tosyl - α-2-aminoheptanedioyl-L-tryptophan ethyl ester.

EXAMPLE 23

8-(2-m-carboxyphenylhydrazide) of α-2-amino-octanedioyl-L-valine

In the same manner as shown in Example 1, 8-(2-m-carboxyphenylhydrazide) of α - 2 - aminooctanedioyl-L-valine was prepared by substituting 8-methyl 2-aminooctanedioate, m-carboxyphenylhydrazine, and L - valine hexyl ester hydrochloride for 5-methyl L-glutamate, phenylhydrazine, and glycine ethyl ester hydrochloride, respectively, to produce 8-(2-m-carboxyphenylhydrazide) of N-carbobenzyloxy-α-2-aminooctanedioyl - L - valine hexyl ester, saponifying the latter and subjecting the saponified product to hydrogenolysis.

Similarly, 8-(2-p-ethylphenylhydrazide) of N - carbobenzyloxy - α - 2 - aminooctanedioyl-L-leucine propyl ester and 8-(2-p-ethylphenylhydrazide) of α-2-aminooctanedioyl-L-leucine; 8-(2-m-butoxyphenylhydrazide) of N - carbobenzyloxy - α-2-aminooctanedioyl-L-methionine butyl ester and 8-(2-m-butoxyphenylhydrazide) of α-2-aminooctanedioyl-L-methionine; 8-(2-o-chlorophenylhydrazide) of N - carbobenzyloxy-α-2-aminooctanedioyl-L-phenylalanine ethyl ester and 8-(2-o-chlorophenylhydrazide) of α-2-aminooctanedioyl-L-phenylalanine were prepared by substituting p-ethylphenylhydrazine and L-leucine propyl ester hydrochloride; m-butoxyphenylhydrazine and L-methionine butyl ester hydrochloride; o-chlorophenylhydrazine and L-phenylalanine ethyl ester hydrochloride, for m-carboxyphenylhydrazine and L-valine hexyl ester hydrochloride, respectively.

Substituting allyl chloroformate and p-toluenesulfonyl chloride for benzyl chloroformate in Example 23 results in the production of 8-(2-m-carboxyphenylhydrazide) of N - carboallyloxy - α - 2-aminooctanedioyl-L-valine hexyl ester and 8-(2-m-carboxyphenylhydrazide) of N-tosyl-α-2-aminooctanedioyl-L-valine hexyl ester; 8-(2-p-ethylphenylhydrazide) of N - carboallyloxy-α-2-aminooctanedioyl-L-leucine propyl ester and 8-(2-p-ethylphenylhydrazide) of N-tosyl-α-2-aminooctanedioyl-L-leucine propyl ester; 8-(2-m-butoxyphenylhydrazide) of N-carboallyloxy-α-2-aminooctanedioyl-L-methionine butyl ester and 8-(2-m-butoxyphenylhydrazide) of N - tosyl-α-2-aminooctanedioyl-L-methionine butyl ester; 8-(2-o-chlorophenylhydrazide) of N-carboallyloxy-α-2-aminooctanedioyl-L-phenylalanine ethyl ester and 8-(2-o-chlorophenylhydrazide) of N-tosyl-α-2-aminooctanedioyl-L-phenylalanine ethyl ester.

EXAMPLE 24

9-(2-m-iodophenylhydrazide) of α-2-amino-nonanedioyl-L-alanine

A. 9-(2-m-IODOPHENYLHYDRAZIDE) OF N-TOSYL-α-2-AMINONONANEDIOYL-L-ALANINE ETHYL ESTER

In the same manner as shown in Example 1, Parts A, B, C and D, 9-(2-m-iodophenylhydrazide) of N-tosyl-α-2-aminononanedioyl-L-alanine ethyl ester was prepared by substituting p-toluenesulfonyl chloride, 9-methyl 2-aminononanedioate, m-iodophenylhydrazine, and L-alanine ethyl ester hydrochloride, for benzyl chloroformate, 5-methyl L-glutamate, phenylhydrazine, and glycine ethyl ester hydrochloride, respectively.

B. 9-(2-m-IODOPHENYLHYDRAZIDE) OF α-2-AMINO-NONANEDIOYL-L-ALANINE 9-(2-m-iodophenylhydrazide) of N-tosyl-α - 2 - aminononanedioyl-L-alanine ethyl ester was saponified with sodium hydroxide and the saponified product was reacted with sodium and liquid ammonia in accordance with the procedure described in J. Amer. Chem. Soc. 79, 639–44, 1957, to produce 9-(2-m-iodophenylhydrazide) of 2-aminononanedioyl-L-alanine.

Similarly, 9-(2-p-propylphenylhydrazide) of N-tosyl-α-2-aminononanedioyl-L-leucine benzyl ester and 9-(2-p-propylphenylhydrazide) of α-2-aminononanedioyl-L-leucine; 9-(2-o-butoxyphenylhydrazide) of N-tosyl - α - 2 - aminononanedioyl-L-tyrosine p-nitrophenyl ester and 9-(2-o-butoxyphenylhydrazide) of α-2-aminononanedioyl-L-tyrosine; 9-(2-p-chlorophenylhydrazide) of N-tosyl-α-2-aminononanedioyl - glycine methyl ester and 9 - (2 - p-chlorophenylhydrazide) of α-2-aminononanedioyl-glycine were prepared by substituting p-propylphenylhydrazine and L-leucine benzyl ester hydrochloride; o-butoxyphenylhydrazine and L-tyrosine p-nitrophenyl ester hydrochloride; and p-chlorophenylhydrazine and glycine methyl ester hydrochloride, for m-iodophenylhydrazine and L-alanine ethyl ester hydrochloride, respectively.

Substituting benzyl chloroformate and allyl chloroformate for p-toluenesulfonyl chloride in Example 24 results in the production of 9-(2-m-iodophenylhydrazide) of N-carbobenzyloxy-α-2-aminononanedioyl - L - alanine ethyl ester and 9-(2-m-iodophenylhydrazide) of N-carboallyloxy-α-2-aminononanedioyl-L-alanine ethyl ester; 9-(2-p- propylphenylhydrazide) of N-carbobenzyloxy-α-2-aminononanedioyl-L-leucine benzyl ester and 9-(2-p-propylphenylhydrazide) of N-carboallyloxy-α-2-aminononanedioyl-L-leucine benzyl ester; 9-(2-o-butoxyphenylhydrazide) of N-carbobenzyloxy-α-2-aminononanedioyl-L-tyrosine p-nitrophenyl ester and 9-(2-o-butoxyphenylhydrazide) of N-carboallyloxy-α-2-aminononanedioyl-L-tyrosine p-nitrophenyl ester; 9-(2-p-chlorophenylhydrazide) of N-carbobenzyloxy-α-2-aminononanedioyl-glycine methyl ester and 9-(2-p-chlorophenylhydrazide) of N-carboallyloxy-α-2-aminononanedioyl-glycine methyl ester.

EXAMPLE 25

*10-(2-p-methoxyphenylhydrazide) of α-2-aminodecanedioyl-L-tryptophan*

A. 10-(2-p-METHOXYPHENYLHYDRAZIDE) OF N-TOSYL-α-2-AMINODECANEDIOYL-L-TRYPTOPHAN p-NITROPHENYL ESTER

In the same manner as shown in Example 1, Parts A, B, C and D, 10-(2-p-methoxyphenylhydrazide) of N-tosyl-α-2-aminondecanedioyl-L-tryptophan p-nitrophenylester was prepared by substituting p-toluenesulfonyl chloride, 10-methyl 2-aminodecanedioate, p-methoxyphenylhydrazine, and L-tryptophan p-nitrophenyl ester hydrochloride for benzyl chloroformate, 5-methyl L-glutamate, phenylhydrazine, and glycine ethyl ester hydrochloride, respectively.

B. 10-(2-p-METHOXYPHENYLHYDRAZIDE) OF α-2-AMINODECANEDIOYL-L-TRYPTOPHAN 10-(2-p-methoxyphenylhydrazide) of N-tosyl-α-2-aminodecanedioyl-L-tryptophan p-nitrophenyl ester was saponified with sodium hydroxide and the saponified product was reacted with sodium and liquid ammonia in accordance with the procedure described in J. Amer. Chem. Soc. 79, 639–44, 1957, to produce 10-(2-p-methoxyphenylhydrazide) of α-2-aminodecanedioyl-L-tryptophan.

Similarly, 10-(2-p-propylphenylhydrazide) of N-tosyl-α-2-aminodecanedioyl-glycine p-nitrophenyl ester and 10-(2-p-propylphenylhydrazide) of α-2-aminodecanedioyl-glycine; 10-(2-p-carboxyphenylhydrazide) of N-tosyl-α-2-aminodecanedioyl-L-tryptophan methyl ester and 10-(2-p-carboxyphenylhydrazide) of α-2-aminodecanedioyl-L-tryptophan; 10-(2-p-iodophenylhydrazide) of N-tosyl-α-2-aminodecanedioyl-L-tyrosine ethyl ester and 10-(2-p-iodophenylhydrazide) of α-2-aminodecanedioyl-L-tyrosine, were prepared by substituting p-propylphenylhydrazine and glycine p-nitrophenyl ester hydrochloride; p-carboxyphenylhydrazine and L-tryptophan methyl ester hydrochloride; and p-iodophenylhydrazine and L-tyrosine ethyl ester hydrochloride for p-methoxyphenylhydrazine and L-tryptophan p-nitrophenyl ester hydrochloride, respectively.

Substituting benzyl chloroformate and allyl chloroformate for p-toluenesulfonyl chloride in Example 25 results in the production of 10-(2-p-methoxyphenylhydrazide) of N-carbobenzyloxy-α-2-aminodecanedioyl-L-tryptophan p-nitrophenyl ester and 10-(2-p-methoxyphenylhydrazide) of N-carboallyloxy-α-2-aminodecanedioyl-L-tryptophan p-nitrophenyl ester; 10-(2-p-propylphenylhydrazide) of N-carbobenzyloxy-α-2-aminodecanedioyl-glycine p-nitrophenyl ester and 10-(2-p-propylphenylhydrazide) of N-carboallyloxy-α-2-aminodecanedioyl-glycine p-nitrophenyl ester; 10-(2-p-carboxyphenylhyrazide) of N-carbobenzyloxy-α-2-aminodecanedioyl-L-tryptophan methyl ester and 10-(2-p-carboxyphenylhydrazide) of N-carboallyloxy-α-2-aminodecanedioyl-L-tryptophan methyl ester; 10-(2-iodophenylhydrazide) of N-carbobenzyloxy-α-2-aminodecanedioyl-L-tyrosine ethyl ester and 10-(2-p-iodophenylhydrazide) of N-carboallyloxy-α-2-aminodecanedioyl-L-tyrosine ethyl ester.

The compounds of the present invention are useful for controlling phytopathogenic fungi, such as *Alternaria solani, Sclerotina fructicola,* and the like, as more fully set forth in U.S. Patents 3,031,456 and 2,993,829.

An additional aspect of the present invention is the use of the phenylhydrazide group (i.e.,

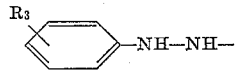

as defined in Formula I) as a protective group when attached to the ω-carboxyl moiety of an α-amino dibasic acid, or to the ω-carboxyl moiety of a dipeptide or higher polypeptide containing such α-amino dibasic acid, and selective cleavage of the phenylhydrazide group in the presence of other protective groups, such as tosyl, carboallyloxy, carbobenzyloxy, or ester, with activated manganese dioxide. The term "ω-carboxyl moiety of an α-amino dibasic acid" refers to the carboxyl which is farthest removed from the amino group. It has unexpectedly been found that the phenylhydrazide group can be selectively cleaved to the free carboxyl group by oxidation with activated manganese dioxide without affecting other protective groups and with no racemization of the product. Thus, the use of the phenylhydrazide group as a protective group and selective cleavage with manganese dioxide provides peptide chemists with an additional tool in the preparation of N-protected α-amino dibasic acids, and dipeptides and higher polypeptides containing the same.

In carrying out the selective cleavage process, the phenylhydrazide-containing α-amino dibasic acid or peptide in a dilute organic acid, such as acetic acid, is treated with activated manganese dioxide at a temperature between about 20 and 40° C., preferably about 25° C. The reaction generally takes from about 20 to 60 minutes; usually about 30 minutes is sufficient.

The following examples are illustrative of this aspect of the present invention:

EXAMPLE I

*L-N-carbobenzyloxyglutamic acid*

A solution of 1.86 g. (0.005 mole) of L-N-carbobenzyloxyglutamic acid 5-(2-phenylhydrazide) (Example 1, Part C) in 50 ml. of 50% aqueous acetic acid was treated portionwise with stirring at 25° C. with 2.18 g. of activated manganese dioxide. The mixture was stirred at 25° C. for 30 minutes and filtered. The precipitate was washed on the funnel with 25 ml. of 50% aqueous acetic acid, 10 ml. of methanol, and finally with 100 ml. of warm ethyl acetate. The filtrate and washings were combined and evaporated under reduced pressure at 38° C. to a syrup which was dissolved in a mixture of 150 ml. of saturated aqueous sodium bicarbonate solution and 100 ml. of ethyl acetate. The mixture was filtered and the lower layer was separated and extracted with two 50-ml. portions of ethyl acetate. The lower layer was then cooled in an ice bath and acidified to Congo red and then saturated with hydrogen sulfide gas. The acidic solution was extracted with three 100-ml. portions of ethyl acetate and the ethyl acetate extracts were washed with two 50-ml. portions of water. The ethyl acetate extracts were combined and dried over anhydrous sodium sulfate and then evaporated to dryness. On crystallization from ethyl acetate-Skellysolve B, 1.071 g. (76%) of L-N-carbobenzyloxyglutamic acid was obtained which melted at 113–115° C. After two recrystallizations from ethyl acetate-Skellysolve B, the product melted at 118—120° C.; it was identical with an authentic sample.

*Analysis.*—Calcd. for $C_{13}H_{15}NO_6$: C, 55.51; H, 5.38; N, 4.98. Found: C, 55.58; H, 5.20; N, 4.49.

EXAMPLE II

*N-carbobenzyloxy-α-L-glutamylglycine ethyl ester*

3.42 g. (0.0075 mole) of 5-(2-phenylhydrazide) of N-carbobenzyloxy-α-L-glutamylglycine ethyl ester (Example 1, Part D) was dissolved in 100 ml. of 60% acetic acid and the solution was treated with 3.92 g. of activated manganese dioxide. The mixture was stirred at 25° C. for 30 minutes. An additional 0.500 g. of manganese dioxide was added and stirring was continued for 15 minutes. The mixture was filtered through filter aid on sintered glass and the solid material was washed with four 20-ml. portions of warm glacial acetic acid, then with 25 ml. of ethyl acetate. The combined filtrate and washings were cooled, saturated with hydrogen sulfide gas, and evaporated under reduced pressure at 25–30° C. The residue was treated with 100 ml. of saturated aqueous sodium bicarbonate solution and the resulting mixture was saturated with solid sodium bicarbonate and filtered. The filtrate was extracted with three 70-ml. portions of ethyl acetate and the ethyl acetate extracts were extracted with two 100-ml. portions of saturated aqueous sodium bicarbonate solution. The aqueous layers were combined, acidified to Congo red with 6 N hydrochloric acid and extracted with three 500-ml. portions of ethyl acetate. The ethyl acetate extracts were washed with 100 ml. of 1 N hydrochloric acid, then with two 100-ml. portions of water. The combined ethyl acetate extracts of the acidic solution were dried over anhydrous sodium sulfate and evaporated to dryness under reduced pressure to yield 2.25 g. (82%) of N-carbobenzyloxy-α-L-glutamylglycine ethyl ester which melted at 108.5–109.5° C. On some occasions the melt resolidified and remelted at 125–126° C. Le Quesne and Young, J. Chem. Soc. 1959 (1950), gave M.P. 120–122° C., and Bergman et al., J. Biol. Chem. 111, 225 (1935), gave M.P. 126° C.

*Analysis.*—Calcd. for $C_{17}H_{22}N_2O_7$: C, 55.73; H, 6.05; N, 6.75. Found: C, 55.68; H, 6.41; N, 7.57.

EXAMPLE III

*N-carbobenzyloxy-α-L-glutamylglycine methyl ester*

A solution of 221 mg. (0.005 mole) of 5-(2-phenylhydrazide) of N-carbobenzyloxy-α-L-glutamylglycine methyl ester (Example 3) in 8 ml. of 50% acetic acid was treated with 218 mg. of activated manganese dioxide. The mixture was stirred for 30 minutes at 25° C., then filtered through filter aid on sintered glass. The solid material was washed with 50 ml. of 50% aqueous acetic acid, then with 15 ml. of warm glacial acetic acid. The combined filtrate and washings were cooled while being saturated with hydrogen sulfide gas, then evaporated under reduced pressure at 25° C. The residue was dissolved in 50 ml. of saturated aqueous sodium bicarbonate solution and the solution was extracted with three 50-ml. portions of ethyl acetate. The ethyl acetate extracts were extracted with two 25-ml. portions of saturated aqueous sodium bicarbonate solution. The combined aqueous layers were acidified to Congo red with concentrated hydrochloric acid and the acidic solution was extracted with three 100-ml. portions of ethyl acetate. The ethyl acetate extracts of the acidic solution were washed with two 25-ml. portions of 1 N hydrochloric acid, combined, dried over anhydrous sodium sulfate, and evaporated under reduced pressure. The residue, on crystallization from ethyl acetate-Skellysolve B (charcoal treatment) yielded 162 mg. (92%) of N-carbobenzyloxy-α-L-glutamylglycine methyl ester with a melting point of 93–95° C.

*Analysis.*—Calcd. for $C_{16}H_{20}N_2O_7$: C, 54.54; H, 5.72; N, 7.92. Found: C, 54.55; H, 5.38; N, 7.71.

EXAMPLE IV

*N-carbobenzyloxy-α-L-glutamyl-L-valine methyl ester*

A solution of 2.43 g. of 5-(2-phenylhydrazide) of N-carbobenzyloxy-α-L-glutamyl-L-valine methyl ester (Example 2, Part A) in 25 ml. of glacial acetic acid and 15 ml. of water was treated with 2.61 g. of activated manganese dioxide. The mixture was stirred at 25° C. for 30 minutes, then an additional 200 mg. of manganese dioxide was added and stirring was continued for 15 minutes. The mixture was filtered through filter aid on sintered glass and the solid material was washed with three 15-ml. portions of warm glacial acetic acid. The filtrate and washings were combined and cooled while being saturated with hydrogen sulfide gas, then evaporated under reduced pressure at 25° C. The residue was dissolved in 75 ml. of saturated aqueous sodium bicarbonate solution and the aqueous solution was extracted with three 50-ml. portions of ethyl acetate. The ethyl acetate extracts were extracted with three 50-ml. portions of saturated aqueous sodium bicarbonate solution. The combined aqueous layers were acidified to Congo red with concentrated hydrochloric acid. The acidic solution was extracted with 200-ml. of ethyl acetate, then with three 150-ml. portion of ethyl acetate. The combined ethyl acetate extracts of the acidic solution were washed with two 50-ml. portions of 1 N hydrochloric acid, then with 50 ml. of water. The ethyl acetate extracts were combined, dried over anhydrous sodium sulfate, and evaporated under reduced pressure. The residue, on crystallization from ethyl acetate-Skellysolve B (with charcoal treatment), yielded 1.220 g. (62%) of crystalline N-carbobenzyloxy-α-L-glutamyl-L-valine methyl ester which on recrystallization from ethyl acetate-Skellysolve B melted at 120.5–121° C.

*Analysis.*—Calcd. for $C_{19}H_{26}N_2O_7$: C, 57.85; H, 6.65; N, 7.10. Found: C, 57.66; H, 6.85; N, 7.33.

EXAMPLE V

*N-carbobenzyloxy-α-L-glutamyl-L-leucine ethyl ester*

A solution of 513 mg. (0.001 mole) of 5-(2-phenylhydrazide) of N-carbobenzyloxy-α-L-glutamyl - L - leucine ethyl ester (Example 4, Part A) in 20 ml. of 50% acetic acid was treated with 522 mg. of activated manganese dioxide. The mixture was stirred at 25° C. for 30 minutes, then an additional 100 mg. of manganese dioxide was added and stirring was continued for 15 minutes. The mixture was filtered through filter aid on sintered glass and the solid material on the funnel was washed with 20 ml. of glacial acetic acid, then with 20 ml. of warm glacial acetic acid. The combined filtrate and washings were cooled while being saturated with hydrogen sulfide gas, then evaporated under reduced pressure at 25° C. The residue was dissolved in 50 ml. of saturated aqueous sodium bicarbonate solution and the aqueous solution was extracted with three 50-ml. portions of ethyl acetate. The ethyl acetate extracts were extracted with 50 ml. of saturated aqueous sodium bicarbonate solution and then with 25 ml. of the sodium bicarbonate solution. The combined aqueous layers were cooled while being acidified to Congo red with concentrated hydrochloric acid. The acidic solution was extracted with three 100-ml. portions of ethyl acetate. The ethyl acetate extracts of the acidic solution were washed with 25 ml. of 1 N hydrochloric acid and 25 ml. of water, combined, dried over anhydrous sodium sulfate, and evaporated under reduced pressure. The crystalline residue, N-carbobenzyloxy-α-L-glutamyl - L - leucine ethyl ester, weighed 330 mg. (78%) and melted at 87–90° C. On recrystallization from ethyl acetate the product melted at 89–93° C. Le Quesne and Young, J. Chem. Soc. 1954 (1950), gave a melting point of 88–94° C.

I claim:

1. A dipeptide having the formula:

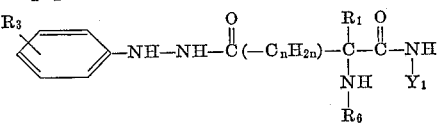

wherein $n$ is an integer from zero to 7, inclusive; $R_3$ is selected from the group consisting of hydrogen, methylol, carboxy, alkyl of 1 to 4 carbon atoms, inclusive, halogen, and alkoxy of 1 to 4 carbon atoms, inclusive; $R_1$ is selected from the group consisting of hydrogen and alkyl of 1 to 4 carbon atoms, inclusive; $R_6$ is selected from the group consisting of carbobenzyloxy, carboallyloxy and tosyl; and $$-\underset{Y_1}{NH}$$

is an α-amino monobasic acid ester residue wherein the ester moiety is selected from the group consisting of alkyl of 1 to 6 carbon atoms, inclusive, benzyl, phenyl, p-nitrobenzyl and p-nitrophenyl.

2. A dipeptide having the formula:

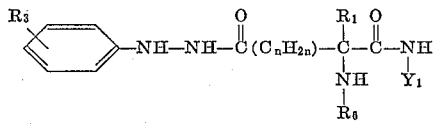

wherein $n$ is an integer from zero to 7, inclusive; $R_3$ is selected from the group consisting of hydrogen, methylol, carboxy, alkyl of 1 to 4 carbon atoms, inclusive, halogen, and alkoxy of 1 to 4 carbon atoms, inclusive; $R_1$ is selected from the group consisting of hydrogen and alkyl of 1 to 4 carbon atoms, inclusive; $R_6$ is selected from the group consisting of carbobenzyloxy, carboallyloxy and tosyl; and

is the residue of an α-amino monobasic acid.

3. A dipeptide having the formula:

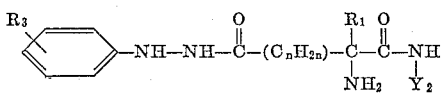

wherein $n$ is an integer from zero to 7, inclusive; $R_3$ is selected from the group consisting of hydrogen, methylol, carboxy, alkyl of 1 to 4 carbon atoms, inclusive, halogen, and alkoxy of 1 to 4 carbon atoms, inclusive; $R_1$ is selected from the group consisting of hydrogen and alkyl of 1 to 4 carbon atoms, inclusive; and

is the residue of an α-amino monobasic acid.

4. 5-(2-phenylhydrazide) of N-carbobenzyloxy-α-L-glutamylglycine ethyl ester.

5. 5-(2-phenylhydrazide) of α-L-glutamylglycine.

6. 5-(2-phenylhydrazide) of N-carbobenzyloxy-α-L-glutamyl-L-valine methyl ester.

7. 5-(2-phenylhydrazide) of α-L-glutamyl-L-valine.

8. 5-(2-phenylhydrazide) of N-carbobenzyloxy-α-L-glutamylglycine methyl ester.

9. 5-(2-phenylhydrazide) of N-carbobenzyloxy-α-L-glutamyl-L-leucine ethyl ester.

10. 5-(2-phenylhydrazide) of N-carbobenzyloxy-α-L-glutamyl-L-phenylalanine ethyl ester.

11. 5-(2-phenylhydrazide) of N-carbobenzyloxy-α-L-glutamyl-L-methionine methyl ester.

12. 5-(2-p-tolylhydrazide) of N-carbobenzyloxy-α-L-glutamyl-L-methionine methyl ester.

No references cited.

LEON J. BERCOVITZ, *Primary Examiner.*